April 6, 1948.　　　S. P. ROBINSON　　　2,439,023
HYDROCARBON CONVERSION PROCESS
Filed July 16, 1946
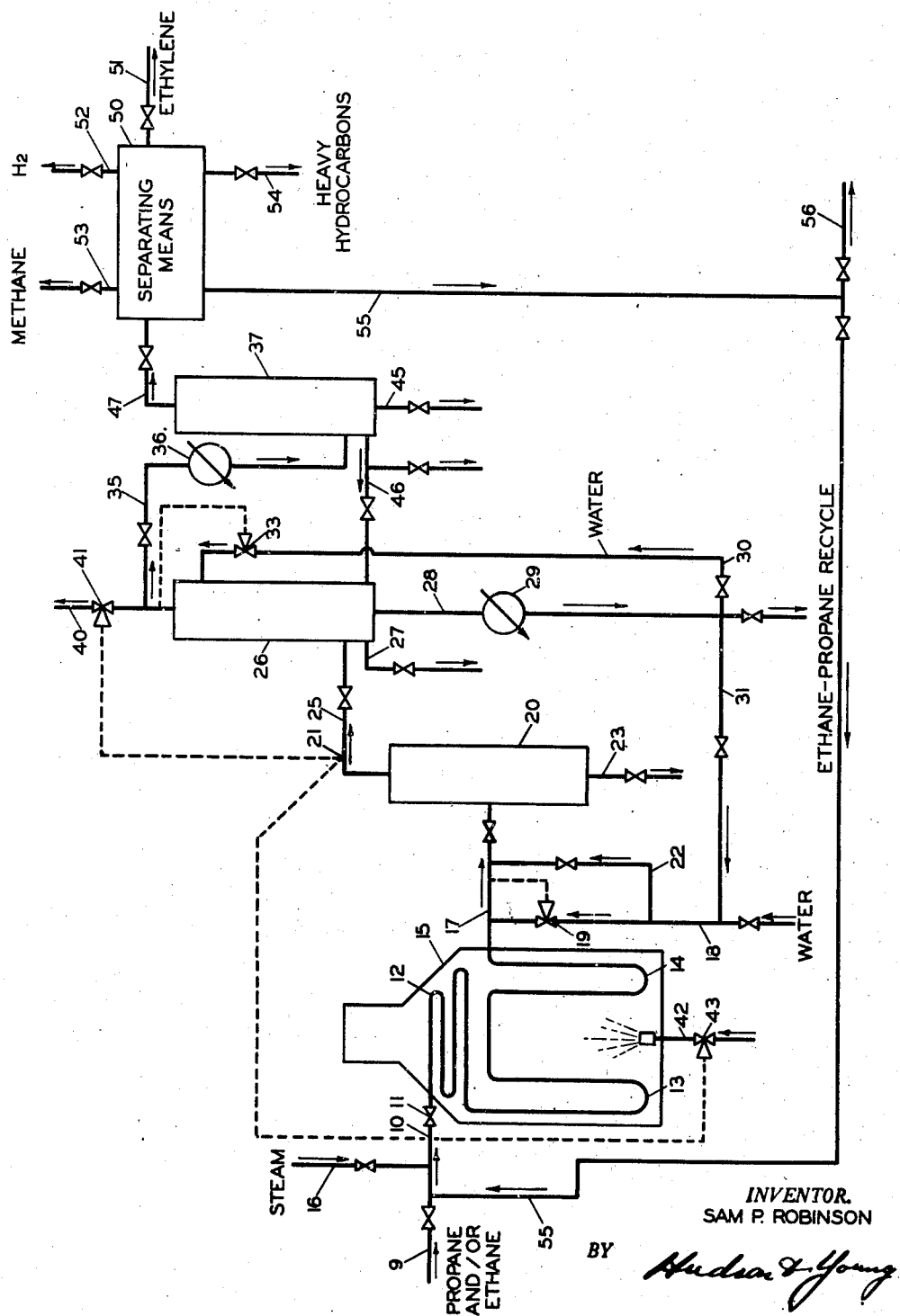
INVENTOR.
SAM P. ROBINSON
BY
*Hudson & Young*
ATTORNEYS Patented Apr. 6, 1948

2,439,023

UNITED STATES PATENT OFFICE 2,439,023

HYDROCARBON CONVERSION PROCESS

Sam P. Robinson, Bartlesville, Okla., assignor to Phillips Petroleum Company, a corporation of Delaware Application July 16, 1946, Serial No. 683,889

4 Claims. (Cl. 260—683)

This invention relates to the conversion of hydrocarbons. In one embodiment it relates to the conversion of low-boiling paraffin hydrocarbons or of low-boiling olefin hydrocarbons, other than a desired unsaturated hydrocarbon, to a low-boiling unsaturated hydrocarbon, and the recovery of the resulting unsaturated hydrocarbon in a highly concentrated form. Another embodiment of the invention relates to the production of ethylene by conversion of normally gaseous hydrocarbons heavier than methane.

The conversion of hydrocarbons to other, less saturated hydrocarbons of lower molecular weight can be readily effected at temperatures above about 1000° F. Such reactions are endothermic, so that it is necessary to supply large quantities of heat, at these high temperatures, in order to obtain an extensive conversion, per pass, of the charge stock. However, the resulting unsaturated hydrocarbons, such as olefins, diolefins, acetylenes, etc., are quite reactive at these same high temperatures, and readily take part in polymerization or condensation reactions which are highly exothermic. As a result, in order to convert a given hydrocarbon material to less saturated hydrocarbons of lower molecular weight not only must the hydrocarbon material be heated to a high temperature and have considerable quantities of heat supplied to it at a high temperature level, but the reaction conditions must be closely controlled. This control must be effective not only to prevent loss of desired products by secondary reactions but also to prevent a conversion process from getting out of control as a result of extensive and self accelerating exothermic reactions of such unsaturated hydrocarbons. I have now found that a continuous conversion process of this nature may be readily controlled by a rapid cooling, or quenching, of the reaction. Reaction times for the desired endothermic reaction are dependent upon the temperature of the conversion and vary, more or less inversely with the temperature, from a few seconds (less than a minute) to as low as about 0.01 second. At temperatures in the region of, and below, 1000° F. the undesired exothermic reactions do not take place rapidly and a suitable upper limit for the cooling can generally be found in this region. In most instances a relatively complex mixture of hydrocarbons results from the desired conversion, and a relatively complex combination of compressors, separators, coolers, condensers, fractional distillation columns, and all usually associated equipment, is necessary to isolate an individual desired unsaturated hydrocarbon product in relatively pure form. For successful operation such equipment must be maintained loaded with hydrocarbon material and the temperature, pressure, and composition of the hydrocarbon mixtures present in any given portion or part of such combination equipment should remain relatively constant. I have now also found that such equipment can be potected by providing for prompt and positive discharge of the reaction effluents from the system in the event adequate cooling or quenching of these effluents fail and, at the same time, providing for cutting off the supply of heat to the conversion zone.

It is an object of this invention to effect a conversion of hydrocarbons at a high temperature.

Another object of this invention is to convert other hydrocarbons to ethylene.

Still another object of this invention is to convert hydrocarbons at a high temperature to low-boiling unsaturated hydrocarbons with a minimum formation of high-boiling hydrocarbons.

A further object of my invention is to provide apparatus for emergency handling of hydrocarbon conversion equipment.

Further objects and advantages of my invention will become apparent, to one skilled in the art, from the accompanying disclosure and discussion.

A preferred embodiment of my invention will now be discussed in connection with the accompanying drawing, which is a diagrammatic flow sheet illustrating schematically various pieces of equipment which can be used in the practice of my invention. Referring now to the drawing, a suitable hydrocarbon charge stock, such as a material comprising a major portion of propane together with some ethane, is introduced through line 10. This is composed of a net charge, introduced through line 9, and of a recycle stream passed through line 55. It is often preferred that this material be substantially free from sulfur compounds, such as hydrogen sulfide and mercaptans, and when so desired a sulfur-containing charge may be treated to reduce its sulfur content. This charge stock, at a pressure not greater than about 40 pounds per square inch absolute, is passed through an expansion valve or orifice 11 to preheating coil 12 and cracking or dehydrogenating coils 13 and 14, which are situated in furnace 15. In coils 13 and 14 the charge is heated to a temperature of about 1350 to about 1650° F. for a time sufficient to give an optimum yield of ethylene. This will generally be about 1.5 to about 0.15 second. In actual plant operation, a furnace 15 will have a plurality of preheating and cracking coils operating in parallel and by means of an expansion valve or expansion orifice 11 at the inlet to each set of coils, the flow through the sets of coils will be more or less uniform. To the hydrocarbon stream, prior to its introduction to the reaction zone, steam is added through line 16. Enough steam is used to passivate catalytic metal and depress coke formation. In some instances about 0.1 to about 0.5% by weight of sulfur will have a similar effect. However, when about 0.2 to 0.5 mol of steam per mol of hydrocarbon is used, the effect of the decreased partial pressure of hydrocarbon reactants is beneficial, and leads to optimum ethylene production, and serves to minimize polymerizing of olefins produced. It is preferred that, in the cracking coils 13 and 14, tubes of a small diameter be used, receiving direct radiant heat and with the diameter of the tubes and the flow of reactants through the tubes so correlated that a lower than usual rate of heat transfer through the tube walls takes place. This results in having more uniform gas temperatures throughout the cross-sectional area of the cracking tube and increases the ratio of heat transfer area per cubic foot of gas handled.

Effluents of cracking coil 14 are passed through line 17 to tar separator 20. Immediately upon the exit of the gases from cracking coil 14, water is injected through line 18 to cool the gases as rapidly as possible, to a temperature below about 1000° F. Unless this is done, beneficial results from careful design of the cracking coils and control of flow rates with heat transfer rates to produce optimum ethylene production will be lost, because ethylene is highly reactive and readily polymerizes at the reaction temperatures. The amount of water introduced through line 18 is controlled by valve 19, which is responsive to the temperature in line 17 at a point which is downstream from the point of water injection. Additional quantities of water are added through line 22 to bring the temperature of the gases to about 250 to about 350° F. As a result, some of the heaviest tars produced during the cracking reaction are condensed and separate from the uncondensed gaseous material. Such tars can be discharged from the process through line 23.

Uncondensed gases pass from tar separator 20 through line 25 to quench tower 26, wherein they are intimately contacted with a spray of water introduced through line 30. The temperature at the top of tower 26 is maintained at about 120 to about 160° F., resulting liquid oils are discharged through line 27. Water at a temperature of about 165° to 265° F. is removed through line 28, cooled in cooler and condenser 29, and recirculated to the process either through line 30 to the spray in the top of tower 26, or through line 31 to line 17. Recirculation of water in a completely closed cycle, as illustrated, has the advantage that the water can be readily maintained free from oxygen.

Uncondensed gases are removed from quench tower 26 through line 35, and passed through cooler 36 to a first separator 37. The temperature of these gases is maintained at between about 120° and 160° F., by control of valve 33 in water line 30 in response to the temperature of the discharged gases. From separator 37 condensed water is removed through line 45 and light oils are passed back to the water quench tower 26 through line 46. The gases in this first separator are at a temperature of about 75 to 130° F. and under a pressure which is slightly above atmospheric pressure, but not greater than about 30 pounds per square inch absolute. Gases are removed through line 47, and passed to separating means 50. Separating means 50 comprises a combination of suitable compressors, coolers, condensers, separators, driers, fractional distillation columns, etc., and usual associated equipment, for separating desired hydrocarbon fractions. In this particular instance an ethylene fraction, in which ethylene is 90 to 95%, or more, of the total fraction, is recovered through line 51. A fraction comprising free hydrogen is recovered through line 52, a fraction comprising methane is recovered through line 53, and undesired heavy hydrocarbons are discharged through line 54. A $C_2$—$C_3$ fraction is recovered through line 55, and may be recycled to the conversion step or discharged, entirely or in part, through line 56. A highly efficient combination of equipment for effecting the separation of such fractions is more fully disclosed and discussed by K. H. Hachmuth in his application Serial No. 683,904, filed July 16, 1946.

At the point 21 in line 25 is a thermocouple or other temperature indicating means, which actuates means to open valve 41 in line 40 and means to close valve 43 in fuel supply line 42. Whenever for any reason the temperature of the gases passing through line 25 rises sufficiently above the desired normal range of 250 to 350° F. that a temperature of incipient exothermic reaction is approached (generally about 1000° F.), this combination of apparatus immediately discharges the gas passing from the top of quench tower 26 and cuts off the fire in furnace 15. As a result the operation of subsequent separation equipment is protected from the violent fluctuations of pressure, temperature, and composition which would result from such an abnormality. Such apparatus may comprise an indicating, recording and controlling potentiometer directly connected to, and operated by, a thermocouple at point 21 and actuating the operation of motor valves at 41 and 43.

As will be appreciated by one skilled in the art, the drawing is entirely diagrammatical, and in actual operation, various additional pieces of conventional equipment, such as pumps, control valves, temperature indicating, recording, and control devices, heaters for reboilers, coolers, heat exchangers, insulation for transfer lines and fractional distillation columns, accumulators and the like, containing materials at subatmospheric temperatures, will obviously be included and can be readily incorporated in any specific case. The temperatures used in the various steps will be closely dependent upon the pressure used, and both will be somewhat dependent upon the compositions of the materials being treated.

My invention will be further illustrated by the following example. In connection with this example, reference is made back to various pieces of equipment illustrated in the drawing. A gaseous $C_2$—$C_3$ hydrocarbon mixture is introduced through valve 9, having a composition shown in the accompanying table. To this is added a recycle stream from line 55, also shown in the accompanying table, and steam to give a total furnace feed passing through expansion orifice 11 as shown in the table. Compositions in the table are in mol per cent.

| | Valve 9 Net Furnace Feed | Orifice 11 Total Furnace Feed | Line 17 Furnace Effluent | Line 52 H₂ Fraction | Line 53 Methane Fraction | Line 51 Ethylene Product | Line 55 C₃—C₅ Recycle |
|---|---|---|---|---|---|---|---|
| $H_2$ | | | 16.0 | 61.8 | 1.7 | | |
| $CH_4$ | 5.7 | 4.3 | 26.9 | 30.9 | 95.3 | 2.1 | |
| $C_2H_2$ | | | 0.1 | | | 0.4 | |
| $C_2H_4$ | 5.5 | 4.1 | 24.8 | 6.4 | 2.6 | 95.0 | 4.7 |
| $C_2H_6$ | 14.4 | 10.8 | 5.0 | 0.9 | 0.4 | 2.5 | 34.1 |
| $C_3H_6$ | 29.3 | 21.9 | 5.4 | | | | 41.4 |
| $C_3H_8$ | 44.1 | 33.1 | 1.1 | | | | 8.5 |
| $C_4H_8$ | | | 0.1 | | | | 0.5 |
| $C_4H_{10}$ | | | 1.5 | | | | 8.7 |
| Oils | 1.0 | 0.8 | 0.2 | | | | 1.4 |
| Tars | | | 2.1 | | | | 0.7 |
| | | | 0.3 | | | | |
| $H_2O$ | | 25.0 | 16.5 | | | | |
| Total | 100.0 | 100.0 | 100.0 | 100.0 | 100.0 | 100.0 | 100.0 |

This mixture is subjected to cracking at a maximum temperature of about 1470° F. under an exit pressure of about 20 pounds per square inch absolute, to give an effluent through line 17 having the composition shown in the table, prior to the introduction of quench water. Sufficient water is directly injected through temperature controlled valve 19, to the stream immediately upon its exit from the cracking coil, to bring the temperature down below 1000° F. Additional water is then added through line 22 to bring the stream temperature to about 300° F. A small amount of tar is removed through line 23, and the gaseous effluent is passed through line 25 to water quench tower 26. A stream of water, introduced through 30 at about 100° F., cools the gases passing through line 35 to about 140° F. When an abnormal interruption in services causes the temperature of the gas passing point 21 to rise from its normal temperature of about 300° F. to about 1000° F., valve 41 immediately opens to discharge the gas passing from quench tower 26, and valve 43 immediately causes the fire in furnace 15 to be killed.

Cooler 36 cools the gas to about 100° F. and condenses most of the remaining water, which is discharged through line 45. The remaining gaseous material is passed through line 47 to separating means 50 wherein it is compressed to a pressure of about 600 pounds per square inch absolute, cooled, and subjected to a series of fractional distillation steps. The hydrogen discharged through line 62 has the composition shown in the table, and the methane fraction discharged through line 53 has the composition shown. The resulting gaseous ethylene stream, removed as a product of the process through line 51, is substantially pure, having the composition shown in the table.

It will be appreciated that various modifications of my invention can be practiced, by one skilled in the art, without departing from the scope or spirit of the disclosure or claims.

I claim:

1. An improved process for the production of ethylene, which comprises passing a reactant stream comprising primarily ethane, propylene and propane together with steam through a long, narrow, externally heated conversion zone, subjecting said stream in said conversion zone to a temperature between about 1350 and about 1650° F. under a pressure between about 15 and about 40 pounds per square inch absolute for a time sufficient to produce an optimum yield of ethylene and a minimum yield of heavier hydrocarbons, continuously introducing water into the stream of reaction products immediately after their passage from said conversion zone in an amount such as to cool said effluents to a temperature below about 1000° F., subsequently introducing additional water into said partially cooled reaction products in an amount sufficient to cool said reaction products to about 300° F., introducing the resulting cooled gaseous mixture into a scrubbing zone and countercurrently contacting same with a stream of water, passing gaseous hydrocarbon effluents of said scrubbing zone to separating means and recovering from said separating means a hydrocarbon fraction comprising ethylene so produced as a product of the process, and simultaneously discharging from the process said gaseous hydrocarbon effluents of said scrubbing zone and cutting off the supply of heat to said conversion zone whenever the temperature of the stream of said gaseous mixture entering said scrubbing zone reaches about 1000° F.

2. An improved process for conversion of propane to optimum yields of C₃ and lighter unsaturated hydrocarbons with minimum concomitant yields of higher-boiling hydrocarbons, which comprises continuously passing a normally gaseous hydrocarbon material comprising propane through a long, narrow conversion zone, heated by combustion of a fuel, maintaining the contents of said conversion zone at an elevated conversion temperature above about 1150° F. and a low pressure for a time such as to produce an optimum yield of C₃ and lighter unsaturated hydrocarbons together with a minimum of heavier hydrocarbons, continuously introducing water into the stream of reaction products immediately after their passage from said conversion zone in an amount such as to cool said effluents to a temperature below about 1000° F., subsequently introducing additional water in an amount sufficient to cool said reaction effluents to about 300° F., introducing the resulting cooled gaseous mixture into a scrubbing zone and countercurrently contacting same was a stream of water, passing gaseous hydrocarbon effluents of said scrubbing zone to separating means, and completely shutting off the aforesaid fuel and simultaneously diverting to discharge from the process the gaseous effluent normally passing from said scrubbing zone to said separating means whenever the temperature of said gaseous material entering said scrubbing zone reaches about 1000° F.

3. An improved process for the conversion of a hydrocarbon to an unsaturated hydrocarbon of lower molecular weight, which comprises passing a stream of a hydrocarbon material heavier than methane through a heated conversion zone, subjecting said hydrocarbon material in said conversion zone to conversion conditions of temperature, pressure and time such as to produce an optimum yield of a hydrocarbon of lower molecular weight and a minimum yield of hydrocarbons of higher molecular weight, immediately and rapidly cooling effluents of said conversion zone to a temperature below that at which unsaturated hydrocarbon products of said conversion will undergo secondary reactions to produce hydrocarbons of higher molecular weight, passing cooled hydrocarbon effluents to separating means and recovering therefrom a hydrocarbon fraction comprising an unsaturated hydrocarbon of low molecular weight so produced as a product of the process, and simultaneously discharging from the process the normal charge to said separating means and cutting off the supply of heat to said conversion zone whenever effluents of said conversion zone are not cooled to a temperature sufficiently low to inhibit secondary reactions of said unsaturated hydrocarbon products of low molecular weight.

4. Apparatus for the conversion of hydrocarbons to unsaturated hydrocarbons of lower molecular weight which comprises, in combination, a conversion zone, a source of heat for said conversion zone, separating means for recovering a desired product of said conversion, conduit means connecting said conversion zone and said separating means, means for cooling effluents of said conversion zone passing through said conduit means prior to their introduction into said separating means, normally closed emergency discharge means for discharging the contents of said conduit means downstream from said cooling means, a temperature responsive device in said conduit means downstream from said cooling means and upstream from said separating means and said discharge means, and means responsive to an elevated temperature indicated by said temperature responsive device for opening said discharge means and simultaneously cutting off said source of heat.

SAM P. ROBINSON.

REFERENCES CITED

The following references are of record in the file of this patent:

UNITED STATES PATENTS

| Number | Name | Date |
|---|---|---|
| 1,984,569 | Cooke | Dec. 18, 1934 |
| 2,067,864 | Stirling | Jan. 12, 1937 |
| 2,111,899 | Nagel | Mar. 22, 1938 |
| 2,263,557 | Greenewalt | Nov. 25, 1941 |